United States Patent
Blazer et al.

(10) Patent No.: US 12,044,893 B2
(45) Date of Patent: *Jul. 23, 2024

(54) HIGH FIBER DENSITY RIBBON CABLE

(71) Applicant: CORNING RESEARCH & DEVELOPMENT CORPORATION, Corning, NY (US)

(72) Inventors: Bradley Jerome Blazer, Granite Falls, NC (US); David Alan Seddon, Hickory, NC (US); Rebecca Elizabeth Sistare, Hickory, NC (US); Kenneth Darrell Temple, Jr., Newton, NC (US); Brandon Robert Williamson, Johnson City, TN (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/874,410

(22) Filed: Jul. 27, 2022

(65) Prior Publication Data

US 2022/0365301 A1    Nov. 17, 2022

Related U.S. Application Data

(60) Division of application No. 16/733,477, filed on Jan. 3, 2020, now Pat. No. 11,442,236, which is a (Continued)

(51) Int. Cl.
   *G02B 6/44*    (2006.01)
   *G02B 6/46*    (2006.01)

(52) U.S. Cl.
   CPC .......... *G02B 6/4432* (2013.01); *G02B 6/441* (2013.01); *G02B 6/448* (2013.01); *G02B 6/567* (2023.05)

(58) Field of Classification Search
   CPC ....... G02B 6/4403; G02B 6/441; G02B 6/448
   See application file for complete search history.

(56) References Cited

U.S. PATENT DOCUMENTS

| 4,078,853 A | 3/1978 | Kempf et al. |
| 4,813,266 A | 3/1989 | Nash |

(Continued)

FOREIGN PATENT DOCUMENTS

| CN | 1325035 A  | 12/2001 |
| CN | 2648464 Y  | 10/2004 |

(Continued)

OTHER PUBLICATIONS

Chinese Patent Application No. 201880053917.4, Office Action dated May 31, 2021, 16 pages (14 pages of English Translation and 2 pages of Original Document), Chinese Patent Office.

(Continued)

*Primary Examiner* — Omar R Rojas
(74) *Attorney, Agent, or Firm* — Thomas R. Irwin

(57) ABSTRACT

An optical fiber cable includes a jacket and a plurality of stranded core subunits, each core subunit comprising a flexible sheath and a plurality of ribbons arranged in a ribbon group, wherein each ribbon of the plurality of ribbons comprises a plurality of connected fibers such that 50-70% of the cross-sectional area inside the sheath is occupied by the connected fibers. The flexible sheath may be an extruded PVC material that conforms to the shape of the ribbon stack and keeps all of the ribbons acting as a unitary body during bending.

20 Claims, 5 Drawing Sheets

Related U.S. Application Data continuation of application No. PCT/US2018/040900, filed on Jul. 5, 2018.

(60) Provisional application No. 62/592,918, filed on Nov. 30, 2017, provisional application No. 62/528,966, filed on Jul. 5, 2017.

(56) References Cited

U.S. PATENT DOCUMENTS

| | | | |
|---|---|---|---|
| 5,751,879 | A | 5/1998 | Graham et al. |
| 6,066,397 | A | 5/2000 | Risch et al. |
| 6,215,931 | B1 | 4/2001 | Risch et al. |
| 6,317,542 | B1* | 11/2001 | Hardwick, III ...... G02B 6/4411 385/112 |
| 6,370,304 | B1 | 4/2002 | Mills et al. |
| 7,039,282 | B2 | 5/2006 | Chiasson et al. |
| 7,346,244 | B2 | 3/2008 | Gowan et al. |
| 7,623,747 | B2 | 11/2009 | De et al. |
| 8,577,196 | B1 | 11/2013 | McNutt |
| 8,582,940 | B2 | 11/2013 | Abernathy et al. |
| 8,582,942 | B1 | 11/2013 | Burnett |
| 10,094,995 | B2 | 10/2018 | Debban et al. |
| 11,442,236 | B2* | 9/2022 | Blazer ............... G02B 6/448 |
| 2001/0033725 | A1 | 10/2001 | Szum et al. |
| 2002/0067900 | A1 | 6/2002 | Mills et al. |
| 2004/0184748 | A1* | 9/2004 | Clatanoff ............ G02B 6/4436 385/113 |
| 2004/0223707 | A1* | 11/2004 | Parsons ................ G02B 6/14 385/100 |
| 2005/0213900 | A1 | 9/2005 | Rhyne et al. |
| 2005/0226573 | A1 | 10/2005 | Okuno et al. |
| 2006/0291787 | A1 | 12/2006 | Seddon |
| 2008/0056652 | A1 | 3/2008 | Nothofer et al. |
| 2010/0135625 | A1 | 6/2010 | Overton |
| 2010/0215328 | A1* | 8/2010 | Tatat ................... G02B 6/4431 385/113 |
| 2011/0069932 | A1 | 3/2011 | Overton et al. |
| 2011/0110635 | A1 | 5/2011 | Toge et al. |
| 2012/0093468 | A1 | 4/2012 | Keller et al. |
| 2012/0121225 | A1 | 5/2012 | McDowell et al. |
| 2012/0177331 | A1 | 7/2012 | Wells et al. |
| 2014/0079361 | A1* | 3/2014 | Smartt ............... G02B 6/44384 385/109 |
| 2015/0177471 | A1 | 6/2015 | Bringuier et al. |
| 2015/0355426 | A1 | 12/2015 | Aguilar et al. |

FOREIGN PATENT DOCUMENTS

| | | |
|---|---|---|
| CN | 101069112 A | 11/2007 |
| CN | 101153942 A | 4/2008 |
| CN | 101238399 A | 8/2008 |
| CN | 105637397 A | 6/2016 |
| CN | 106104346 A | 11/2016 |
| EP | 2711754 A1 | 3/2014 |

OTHER PUBLICATIONS

Chinese Patent Application No. 201880053917.4, Office Action dated Nov. 5, 2021, 13 pages English Translation Only, Chinese Patent Office.

European Patent Application No. 18828116.6, Extended European Search Report dated Feb. 22, 2021; 8 pages; European Patent Office.

International Preliminary Report on Patentability of the International Searching Authority; PCT/US18/040900; Mailed Oct. 15, 2020; 9 Pages; Commissioner for Patent.

International Search Report and Written Opinion of the International Searching Authority; PCT/US18/040900; Mailed Sep. 19, 2018; 3 Pages; Commissioner for Patents.

* cited by examiner 1.0 in / 25 mm 1.25 in / 32 mm 0.8 in / 21 mm 1.1 in / 28 mm 1.3 in / 33mm

HIGH FIBER DENSITY RIBBON CABLE

CROSS-REFERENCE TO RELATED APPLICATIONS

This application is a divisional of U.S. patent application Ser. No. 16/733,477 filed Jan. 3, 2020, which is a continuation of International Application No. PCT/US2018/040900 filed on Jul. 5, 2018, which claims the benefit of priority to U.S. Application No. 62/528,966, filed on Jul. 5, 2017, and U.S. Application No. 62/592,918, filed on Nov. 30, 2017, the content of which is relied upon and incorporated herein by reference in their entirety.

BACKGROUND

The disclosure relates generally to optical communication cables and more particularly to high fiber count optical communication cables with outside diameters configured to fit into ducts of specified dimensions. High fiber count optical communication cables may be used, for example, in hyper data center applications where the demand for fiber counts in a single cable may exceed 3,000 fibers. Yet often the need exists to use existing ducts having small inside diameters for routing of these high fiber density cables. In addition, fiber density inside cables is an important factor in total cost for network installers. Doubling the fiber count in the existing cable diameter, for example, can save more money in installation costs (i.e., not requiring a new duct, not requiring a second cable pull) than the actual cost of the higher density cable.

Today's conventional ribbon cables are based on technologies that have changed very little for nearly twenty years. For example, conventional 216 fiber ribbon stacks typically comprise eighteen 12 fiber ribbons. As cable prices have decreased over the years, cable installation costs have continued to increase. Accordingly, there is a desire to put more fibers in the same space in order to reduce total installed costs. The trend is toward smaller diameter cables and/or the most fibers possible that can fit inside a given diameter duct space.

Cable suppliers have been working on higher fiber density cable solutions, resulting in, for example, 2000 fiber cable solutions with cable diameters similar to the 1000 fiber cable solutions of yesteryear. Some such cable solutions rely on rollable ribbon concepts, which incorporate, for example, intermittent webs lightly tacking the fibers together to create flexible ribbons that can be more easily rolled to conform to high density packing in a cable jacket or duct.

Cable density can be reviewed in terms of jacket outer diameter, in terms of inside the jacket inner diameter, and in terms of inside the subunit diameter. Conventional loose tube cables with 250 μm fiber may have fiber densities of 4.5% in the jacket outer diameter (i.e., the area ratio of the sum of the areas using the colored fiber diameters divided by the total area of the jacket outer diameter), 7.4% inside the jacket inner diameter, and 29% inside the subunit (e.g., inside a 'buffer tube' or sheath).

Colored fiber area to 'cable unit' area ratios may be converted to 'fibers per mm2'. Table 1 below illustrates this relationship:

TABLE 1

| area ratio (fiber area to cable unit area) | f/mm^2 with 250 μm | f/mm^2 with 208 μm |
| --- | --- | --- |
| 10% | 2.0 | 2.9 |
| 20% | 4.1 | 5.9 |
| 30% | 6.1 | 8.8 |
| 40% | 8.1 | 11.8 |
| 50% | 10.2 | 14.7 |
| 60% | 12.2 | 17.7 |
| 70% | 14.3 | 20.6 |
| 80% | 16.3 | 23.5 |
| 90% | 18.3 | 26.5 |
| 100% | 20.4 | 29.4 |

As shown, an area ratio of 50% colored fiber area to cable unit area with 250 nm colored fiber has 10.2 fibers per mm$^2$, and a similar area ratio with 208 nm colored fiber has 14.7 fibers per mm$^2$.

Loose fibers (i.e., totally un-connected fibers) have the ability to be packed tightly inside cable units. Some of today's micro cables have extremely high loose fiber densities, such as the Corning 288F MiniXtend® HD cable with 208 nm fiber at a density or area ratio of 59%, the Corning 72F MiniXtend® cable with 250 nm fiber at a density or area ration of 62%, and the Prysmian Group 864F FlexTube® cable with 200 nm fiber at a density or area ratio of 42% inside the subunits. These cables have high densities in the outer jacket density, of 13%, 16% and 16% respectively, versus 4.5% for conventional loose tube cables. However, single fiber splicing may be very time and labor consuming with loose fiber cables resulting in higher implementation costs compared to cables that allow mass fusion splicing. There is a desire to be able to mass fusion splice twelve fiber (12F) groups that are already aligned in color order within a cable. Loose fiber cables may be ribbonized in the field after cable stripping, however resulting in additional time and cost.

Newer cable designs employ rollable or pliable ribbons, which are typically ribbons having fibers that are intermittently connected with conventional ribbon matrix along the longitudinal length rather than having completely solid ribbon matrix surrounding the individual fibers along the entire longitudinal length. Intermittent connections allow the 12F ribbons to roll up almost like loose fibers versus remaining in a rigid 1F×12F array. Intermittent connections also maintain the 12 fiber color orientation for the mass fusion splice after the rollable ribbon is removed from the cable and flattened.

Attenuation of the fibers inside the cable due to the stresses induced during cable manufacturing and coiling, and due to cable tension and bending during field installation, is a primary concern for these high fiber density rollable ribbon cables. Bending attenuation is characterized as mainly macrobending attenuation, but microbending attenuation can also be significant. Conventional cables having lower densities typically use standard G.652.D fibers with Mode Field Diameters (MFDs) of 9.2 μm. In high density cables, as the fiber count increases, the physics of the bending problem—the minimum bend diameter of any one fiber within the cable—may require more bend insensitive fiber with MFDs of 8.8 μm or lower.

For example, a cable designer may start with G.652.D fiber in a lower fiber count cable having a lower density ratio, and as fiber count increases, rely on more bend insensitive fiber, G.657.A1, G.657.A2/B2 or even G.657.B3, to achieve acceptable cabled attenuation values from cable manufacturing and through the rigors of cable installation. If fibers used in a cable have a MFD of <9 microns (e.g., 8.6 or 8.8 microns), this may create a mode-field mismatch. Splicing 8.8 nm MFD fibers to pre-existing or pre-installed 9.2 nm MFD fibers may result in the appearance of bad splices to a field technician.

Moreover, identification of 12F ribbons and groups of ribbons in the high fiber count cables may become difficult. Many conventional high density rollable ribbon cables on the market today have no routable subunits to keep groups of ribbons separated and identified once separated from the jacket. Identification is needed at initial install, but also at restoration events and other future network maintenance events, for example during new end-user-customer adds and changes. Upon jacket removal, conventional cables rely on colored binder threads or slotted core structures to identify and/or group sets of rollable ribbons. For example, in certain conventional high fiber count cables, once the jacket is removed, groups of rollable ribbons (e.g., twelve groups of twelve 12F rollable ribbons) may be separately identified by colored binder threads. However, when handling these groups, the binder threads can easily separate and/or unwind from the core, and the identification of that group is immediately lost.

In slotted core cables, upon jacket removal, groups of pliable or rollable ribbons (e.g., 432F or thirty six 12F pliable or rollable ribbons) may be separated or removed from each of the slots. Upon removal from the slot, however, there is no other method within the cable construction to keep the fibers (e.g., 432F) from one slot separately identified from the fibers in the other slots.

For these types of conventional cables, a separately obtained set of parts outside the cable itself must be used and applied to manage the bundles of rollable ribbons until splicing and containment is complete. These additional parts and systems as well as the associated methods of handling and splicing require additional installer time, cost and patience. In addition, during future time of restoration, the separately obtained set of parts must be re-obtained to help keep ribbons and fibers organized once again.

During initial installation and/or future openings of closures or cabinets, the separated and unorganized intermittently connected fibers and ribbons lack protection. Loose fibers between connection points are notorious for catching on anything and everything. Accordingly, field technicians may be instructed to install sleeves or furcation tubes to protect and organize the exposed fibers, adding yet additional material cost as well as time and effort to an installation.

Finally, although intermittently connected fiber ribbons may foster 12F mass fusion splicing as compared to loose 12F fiber splicing, the intermittently connected fiber ribbon is not as easy and fast to identify and splice as conventional solid matrix ribbons. Intermittently connected or rollable ribbons must rely on complicated marking schemes, such as ring or tally mark identification, for identification of individual fibers. Rather, solid ribbons allow direct printing onto the solid matrix with legible characters. Additional information like fiber type (e.g., G.652.D) or fiber diameter (e.g., 200 nm or 250 µm) can be printed in characters on the solid matrix ribbons which is not possible when relying on a tally marking system that is typical of some conventional rollable ribbon high fiber count cables.

Also, while the fiber colors may remain in order, the intermittently connected ribbon must still be manipulated and handled carefully to prepare for splicing, compared to conventional solid matrix ribbons which are more robust.

To enable easier handling for splicing in the field, a high density ribbon stack cable is needed with ribbons that retain at least some of the solid structure of conventional ribbons when compared, for example, to the rollable ribbon solutions of conventional cables.

SUMMARY

A high density ribbon cable includes a jacket and a plurality of stranded core subunits, each core subunit comprising a flexible sheath and a plurality of ribbons arranged in a ribbon group, wherein each ribbon of the plurality of ribbons comprises a plurality of connected fibers such that 50-70% of the cross-sectional area inside the sheath is occupied by the connected fibers.

The flexible sheath may be an extruded PVC material that conforms to the shape of the ribbon stack and keeps all of the ribbons acting as a unitary body during bending, but which is just loose enough around the ribbon group that when a length of subunit is (individually or as a group inside the cable) bent and coiled, the individual ribbons are free to adjust themselves longitudinally with respect to each other, thereby preventing any one ribbon from buckling during cable bending.

The flexible PVC material of the sheath enables very high density ribbon cable designs with a fiber density range of 19 to 23% of the jacket outer diameter, 27-33% inside the jacket inner diameter and 50-70% inside the core subunits while preserving attenuation performance using G.652.D fiber, for example.

DETAILED DESCRIPTION

Figure 1:
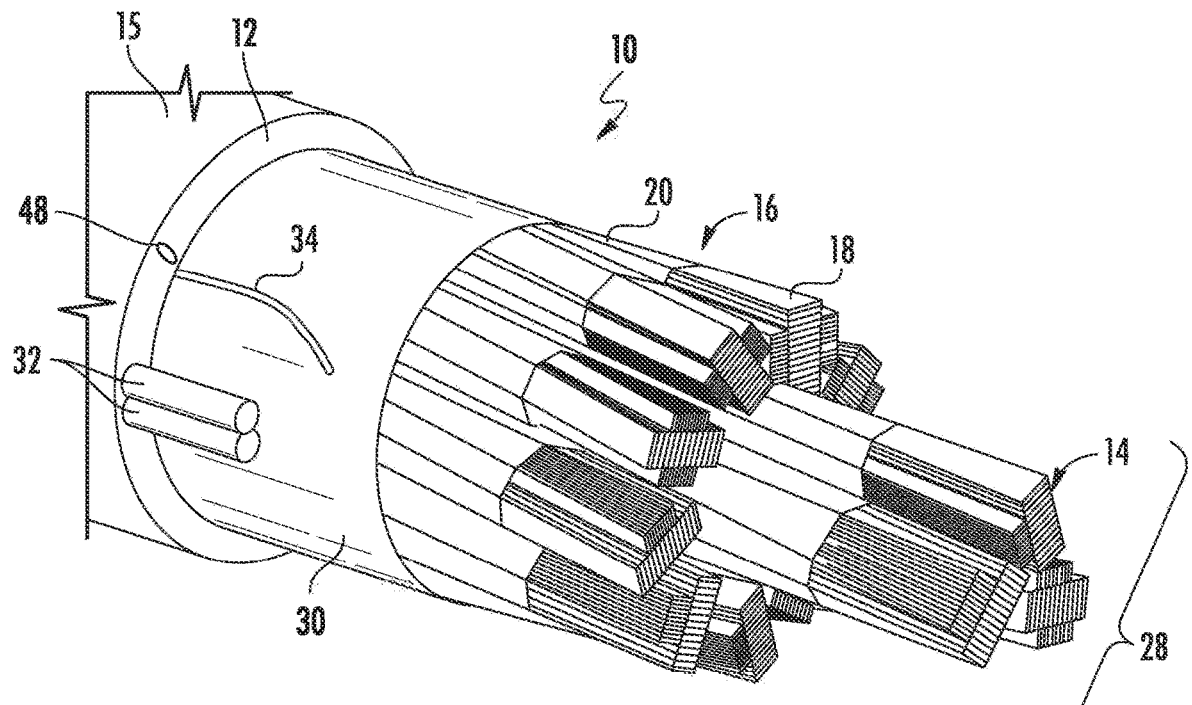
FIG. 1 is an isometric cutaway view of a fiber optic cable in accordance with aspects of the present disclosure.
Figure 2:
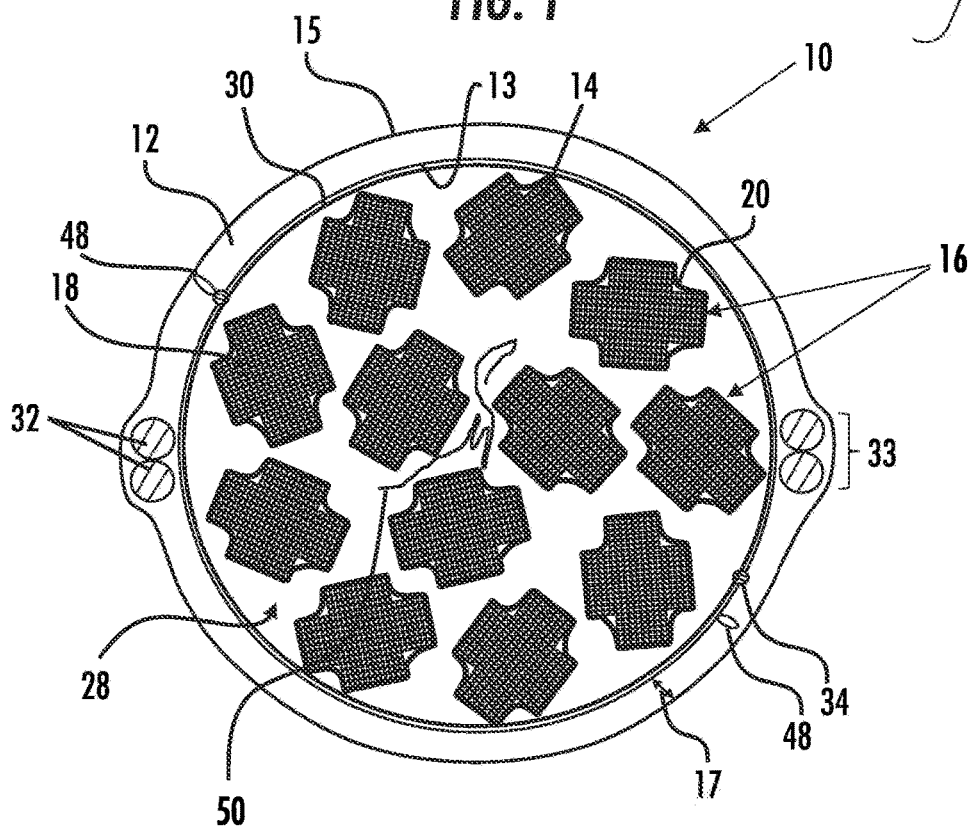
FIG. 2 is a cross-sectional view of the cable shown in FIG. 1, in accordance with aspects of the present disclosure.

Referring to FIGS. 1 and 2, an optical communication cable, shown as cable 10, is shown according to an exemplary embodiment. Cable 10 includes a cable body, shown as cable jacket 12, having an inner surface 13 defining an internal area or region within which various cable components or core elements as discussed below are located and an outer surface 15 generally defining an outside diameter (OD) of the cable 10. Generally, a plurality of optical fibers 14 is included among the cable components, and the cable 10 provides structure and protection to the plurality of optical fibers 14 during and after installation (e.g., protection during handling, protection from elements, protection from vermin, etc.).

In accordance with aspects of the present disclosure, a first type of core element may be an optical transmission core subunit 16 comprising an optical fiber group 18 of individual optical fibers located within a thin sheath 20. A plurality of these optical transmission core subunits 16 may be provided wound in a pattern or arrangement (e.g., a spiral pattern, a helical pattern, SZ pattern, etc.). Together, the stranded and/or grouped optical transmission core subunits 16 may form a core 28 of cable 10. The plurality of optical transmission core subunits 16 may be wound around a central support member, or as shown in FIG. 1, the core 28 may be free of conventional strength members. The cable 10 may derive strength characteristics from the configuration of the optical transmission core subunits 16 themselves and/or the jacket 12 which may include embedded strength members.

At least one enclosing element 30, such as a film binder, binder tapes, armor or armor tape, or a water-swellable tape, for example, may be provided to surround the core 28 between the core and the jacket 12. In the case of the enclosing element 30 being a film or membrane, located around the stranded subunits 16, the film may be an extruded thin film that cools to provide an inwardly directed force on to the core subunits 16 and other core elements, which may include filler rods or tubes and a central strength member, for example. The inwardly directed force provided by the film assists to hold stranded subunits 16 in relative position with respect to one another. Thus, in some embodiments, an interference fit is provided between the outer surfaces of the core elements and the film such that the film acts to provide an inwardly directed force onto the core elements of cable 10 to prevent/resist unraveling of the wound core elements, for example.

In various embodiments, the film forming the enclosing element 30 is formed from a first material, and jacket 12 may be formed from a second material. In various embodiments, the first material is different from the second material. In some such embodiments, the material type of the first material is different from the material type of the second material. In various embodiments, the film may be formed from a variety of extruded polymer materials. In various embodiments, the film may be formed from low-density polyethylene (LDPE), polyester, or polypropylene. In one embodiment, the film is formed from a linear LDPE. In one embodiment, the film is formed from an LDPE material having a modulus of elasticity between 600 MPa and 1000 MPa, and more specifically about 800 MPa (e.g., 800 MPa plus or minus 5 percent). In one embodiment, the film is formed from a polyester material having a modulus of elasticity between 2000 MPa and 2800 MPa, and more specifically about 2400 MPa (e.g., 2400 MPa plus or minus 5 percent). In various embodiments, the material of the film may include a coloring material. In addition, the film may include UV stabilizing compounds and may include weakened areas (e.g., lower thickness areas) that facilitate tearing.

As noted above, the first material of the film may be different from the second material of jacket 12. In some such embodiments, the film may be formed from a first material that is extruded at an earlier time or earlier stage in cable production than jacket 12. In such embodiments, the film is formed prior to formation of jacket 12. In some such embodiments, a first extrusion process forms the film at an earlier time in cable production, and a second extrusion process forms jacket 12 at a later time in cable production. In some such embodiments, the first material of the film and the second material of jacket 12 are the same type of material (e.g., both are MDPE, PP, etc.) that are associated with cable 10 at different time points during production of cable 10. In other embodiments, the first material of the film and the second material of jacket 12 are the different types of material (e.g., the film is a LDPE and jacket 12 is MDPE) and may also be associated with cable 10 at different time points during production of cable 10.

The film may also be a thick film, for example having a thickness of 0.5 millimeters or more, wherein the film that is the enclosing element 30 is the sole or primary protection for the core 28. A thin jacket 12 may be extruded over the thick film.

The jacket 12 may be formed from an extruded polymer material having a wall thickness 17 of between 1.0 mm and 4.0 mm. In accordance with aspects of the present disclosure, the wall thickness 17 of the jacket 12 may be in the range of 7-10% of the outside diameter (OD) of the jacket 12 for balancing kink resistance with overall cable flexibility of the cable 10.

In accordance with yet other aspects of the present disclosure, the jacket 12 may be a co-extruded polymer jacket with a bonded nylon layer, for example, having the same total wall thickness, or a dual-layer jacket of similar thickness with stranded strength elements between the layers. The stranded strength elements may be aramid yarns or impregnated fiberglass strands, for example, that cover 50-100% of the inner jacket layer and allow portions of the outer jacket layer to bond to the inner jacket layer during the extrusion process.

The jacket 12 may be comprised of a base material such as polyethylene, polypropylene, ethylene-propylene, copolymers, polystyrene and styrene copolymers, polyvinyl chloride, polyamide (i.e., nylon), polyesters such as polyethylene terephthalate, polyetheretherketone, polyphenylene sulfide, polyetherimide, polybutylene terephthalate, as well as other plastic materials. In accordance with aspects of the present disclosure, the jacket 12 may be made of low density, medium density or high density polyethylene materials. Such polyethylene materials can include low density, medium density or high density ultra-high molecular weight polyethylene materials. The jacket 12 may include low-smoke zero halogen materials such as low-smoke zero halogen polyolefins and polycarbons.

As shown in FIGS. 1 and 2, pairs of strength members 32 may be arranged on opposite sides of the cable 10 cross section. The jacket 12, the core subunits 16, the enclosing element 30, and the strength members 32 can all extend longitudinally along the entire or substantially all of the length of the cable 10. The strength members 32 may be wholly or substantially embedded in the cable jacket 12. In the illustrated embodiment, the strength members 32 are circular in cross-section with each strength member 32 having a diameter in the range of 1 to 3 mm, for example 2.05 mm in the case of a cable 10 having an OD of 33 mm, wherein the wall thickness of the jacket 12 is approximately 2.5 mm. The "strength member height" 33 is defined as the spacing between the outermost edges (shown as the uppermost and lowest edges in FIG. 2) of the outermost strength members on one side of the cable. As also shown in FIG. 2, the strength members 32 may abut one another so the strength member height 33 is the sum of the diameters of the strength members 32 on each side of the cable 10. For example, where the strength members 32 have a strength member diameter of 2.05 mm, the strength member height 33 would be equal to 4.1 mm if the strength members 32 are abutting.

By having a plurality of strength members 32 on opposite sides of the cable 10, as shown in FIGS. 1 and 2, the outside diameter of the strength members 32 may be reduced, which in turn allows a reduction in the wall thickness of the jacket 12 necessary to provide the strength, flexibility, and protective qualities desired.

Although shown with strength members 32 on substantially diametrically opposed sides of the cable 10, other suitable configurations may include, for example, the strength members 32 arranged at locations offset from the diametrical configuration described above or, for example, a plurality of individual strength members 32 arranged radially at substantially evenly spacial points around the circumference of the cable. The latter arrangement of the strength members 32 may be used, for example, to eliminate preferential bend planes from forming in the cable 10.

The strength members 32 may be dielectric rigid/semi-rigid strength members, such as glass-reinforced polymer (GRP) rods with circular cross-sections, although other suitable materials (e.g. steel) and/or cross-sections may be used. In accordance with yet other aspects of the present invention, the strength members 32 may be aramid yarns or impregnated fiber glass yarns, for example. The strength members 32 may be encapsulated in a suitable bonding material, such as an ethyl acrylic acid (EAA) copolymer material, to enhance the bonding characteristics of the strength members 32 to the jacket 12. The strength members 32 may thus provide tensile strength to the cable 10 while providing resistance to jacket shrinkage during the jacket extrusion process and cold weather cycling down to −40° C.

Figure 7:
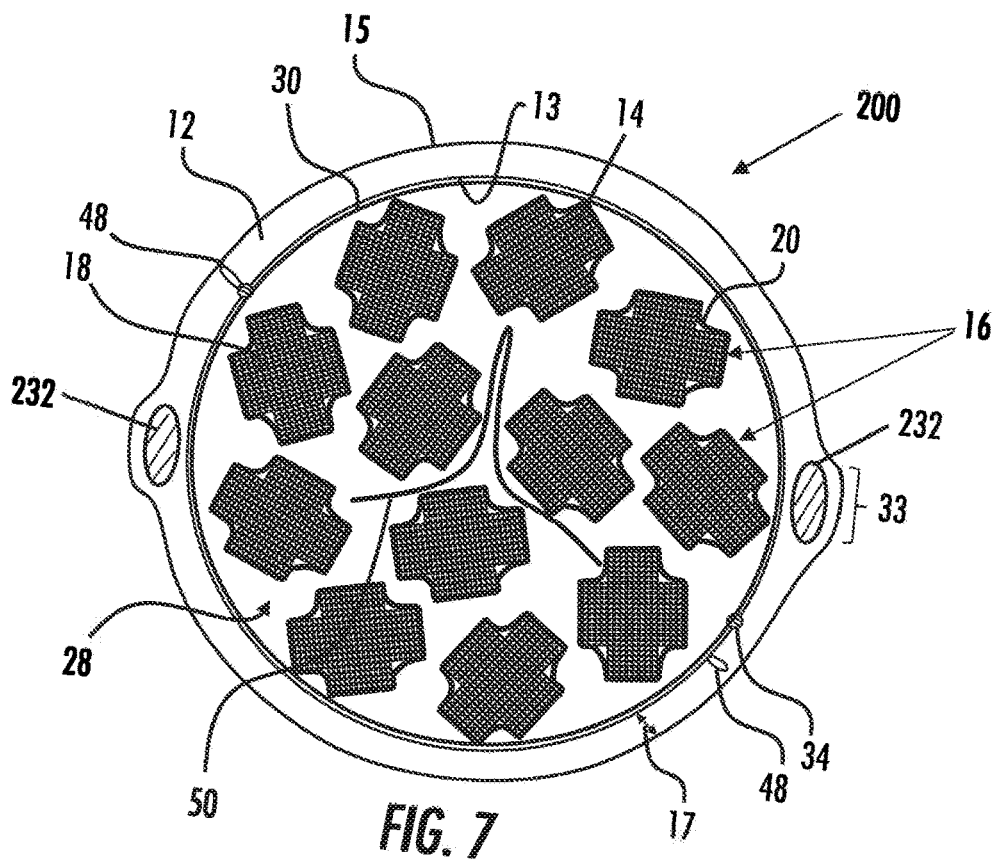
FIG. 7 is a cross-sectional illustration of a cable with various alternative features from the cables shown in FIGS. 1 and 2, in accordance with aspects of the present disclosure.

In accordance with yet other aspects of the present disclosure, as shown in FIG. 7, a cable 200 may incorporate many of the same features discussed above with reference to FIGS. 1 and 2. However, the cable 200 may have only one strength member 232 on each side of the cable in a substantially diametrically opposed relationship rather than the pairs of strength members 32 shown in FIGS. 1 and 2. Moreover, the strength members 232 may have non-circular geometric properties, such as being ovular or generally rectangular in cross-sectional shape. By flattening a typically round strength member 32 to be an ovular or a generally more flat rectangular strength member 232, the wall thickness of the jacket 12 in the area of the strength members 232 may be further reduced while continuing to provide the necessary strength, flexibility, and protective qualities to the cable 10. For example, as shown in FIG. 7, compared to a cable with four strength elements 32 of 2.05 mm GRP's have an EA (modulus of elasticity×cross-sectional area) of 660 kN and a total wall thickness of approximately 3.05 mm with 1.0 mm of jacket over the GRPs. Cable 200 may have only two strength members 232 that are only 1.4 mm wide and have a strength member height 33 of 4.1 mm with 0.3 mm of wall inside of each strength member 232 and approximately 0.7 mm of wall thickness outside of the strength member 232 for a total wall thickness of approximately 2.4 mm. The resultant EA of 660 kN for the cable 200 is the same as that of the cable 10 having four strength members 32. In general, the EA of the jacket 12 with dielectric strength members 232 may be greater than 400 kN with a total wall thickness including the strength members 232 being less than 2.6 mm. The EA of the jacket 12 with strength members 232 comprising steel wire, for example, may be greater than 400 kN with a total wall thickness including the strength members 232 being less than 2.0 mm.

As shown in FIGS. 1 and 2, ripcords 34 may be provided to, upon application of a sufficient outwardly directed pulling force, rip through at least a portion of one of the cable components, for example, the enclosing element 30 and/or the jacket 12 to provide access to the core 28. In addition to or in place of the ripcords 34, the jacket 12 may comprise access features 48 that facilitate access to the core 28. For example, a pair of diametrically opposed discontinuities may be co-extruded to extend along the length of the jacket 12 to enable easy separation of the jacket along a centerline of the cable 10.

The cable jacket 12 may include one or more embedded elongate members, shown as access features 48. In general, access features 48 are elongate members or structures embedded within the material of cable jacket 12. In various embodiments, access features 48 are contiguous members that extend the length of cable jacket 12 between the first and second ends of the cable.

In general, cable jacket 12 is made from a first material, and access features 48 are made from a second material that is different from the first material. The difference in materials provides a discontinuity or weakness within cable jacket 12 at the location of access features 48. These discontinuities provide an access point that allows a user of cable 10 to split cable jacket 12 when access to subunits 16 may be desired. In various embodiments, access features 48 may be formed from a material (e.g., a polypropylene/polyethylene blend) with low bonding relative to the material of cable jacket 12 (e.g., a medium density polyethylene) that allows for jacket splitting by the user. In various embodiments, access features 48 may be formed (e.g., coextruded) as described below. In other embodiments, access features 48 are non-extruded elements, such as rip cords, that are embedded in the material of cable jacket 12.

In the exemplary embodiment, the access features 48 are bonded to the main portion of the jacket when the jacket 12 is extruded. The main portion and the access features 48 can be formed from extrudable polymers, so that as the extrudate used to form the main portion of the jacket 12 and the access features 48 cools and solidifies, the extrudates become bonded at an interface of the access features 48. When the access features 48 are formed while extruding in the same step as the main portion of the jacket 12, the bond between access features 48 and the remainder of the jacket 12 can be generally described as enabled by polymer chain entanglement as the jacket 12 solidifies. The jacket 12 accordingly comprises a cohesive composite structure. The interfaces may be a transition region between the materials of the main portion of the jacket 12 and the access features 48.

The access features 48 can be relatively narrow strips in the jacket 12, and may occupy relatively small portions of the jacket cross-sectional area. In FIG. 2, two access features 48 are formed in the jacket 12 to facilitate opening of the jacket. However, the number, spacing, shape, composition and other aspects of the access features 48 can be varied.

In accordance with aspects of the disclosure, the main portion of the jacket 12 may be extruded from medium density polyethylene (MDPE), and the access features 48 may be extruded from polypropylene (PP). The jacket 12 may be formed in a coextrusion process so that the main portion of the jacket 12 and the access features 48 bond during cooling to form relatively strong bonds at the interfaces. In accordance with yet other aspects of the disclosure, tactile or visual features may be provided on an exterior of the cable 10 to serve as location features for locating the access features 48.

Figure 3:
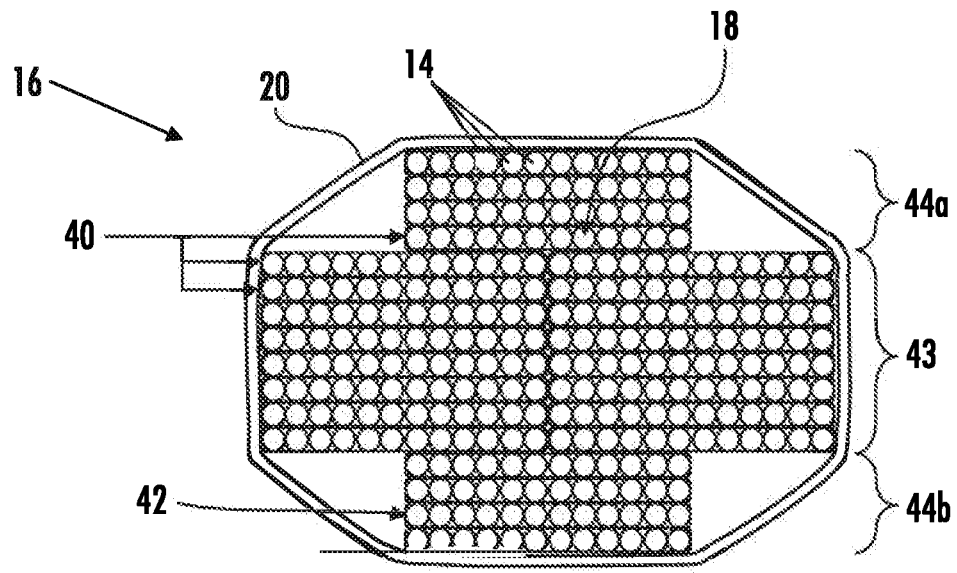
FIG. 3 is a cross sectional view of an optical fiber subunit, in accordance with aspects of the present disclosure.

FIG. 3 is an enlarged view of a core subunit 16 showing the optical fiber group 18 surrounded by the sheath 20. Each optical fiber group 18 may comprise any multiple of optical fiber layer 40. Each optical fiber layer 40 may comprise a plurality of fibers grouped into sets and connected, intermittently or continuously, to form base ribbons 42 arranged in substantially horizontal fashion. In accordance with aspects of the present disclosure, the base ribbons 42 may be comprised of four, eight, twelve, sixteen, twenty four or thirty six optical fibers 14 encased in a conventional cured ribbon matrix. As shown in FIG. 3, the base ribbons 42 may be comprised of twelve or twenty four optical fibers 14 encased in a conventional cured ribbon matrix to form twelve-fiber (12F) and twenty-four fiber (24F) base ribbons 42.

In the case of a 24F base ribbon 42, for example, the 24F ribbon may have a feature, such as a weakened portion or preferential tear feature, for easily separating the 24F ribbon or folding the 24F ribbon into a plurality of ribbons of smaller fiber counts, such as two 12F ribbons for ease in splicing or stacking. Optical fiber ribbons with manufactured weakened portions for allowing groups of fibers in the ribbon to be separated or folded into subunits, such as the types of ribbons disclosed in U.S. Pat. No. 7,039,282, the entirety of which is incorporated herein by reference, may be used for the base ribbons 42 disclosed herein. Although disclosed herein with respect to a 24F ribbon, the weakened portions or preferential tear features may also apply to Although rollable ribbons may comprise the base ribbons 42 used to form the ribbon layers 40 disclosed herein, aspects of the present disclosure may be directed toward ribbons having a more solid, continuous ribbon matrix to overcome difficulties in handling and splicing experienced with intermittently connected or rollable ribbons. In particular, mass fusion splicing of multiple 12F 200 μm or 250 nm ribbons, for example, is easier and faster than similar mass fusing splicing of flexible rollable ribbons and much easier and faster than field ribbonizing loose fibers or single fiber mass fusion. Although referred to herein as 200 nm fiber or 250 nm fiber, the actual diameters of fibers may differ in accordance with various attributes. For example, although referred to as 200 nm fiber, the actual diameter of the fiber may be closer to 208 nm when accounting for a coloring layer that may be separately applied to the individual fibers for efficient identification.

In accordance with aspects of the present disclosure, the base ribbons 42 disclosed herein may comprise a single layer matrix or a dual layer matrix having an inner matrix and an outer matrix. The single layer matrix or the inner matrix and/or outer matrix of the dual layer matrix may comprise a resin matrix material that is mixed with a pigmented material to produce a tinted color appearance. In accordance with yet other aspects, the resin matrix material may be colored by use of an organic or inorganic dye in the resin matrix material. The coloring of the matrix material may be adjusted to provide varying degrees of tint or opacity. The coloring of the ribbon matrix may produce various shades or tints of white, blue, orange, green, brown, and slate, for example, although other colors such as red, black, yellow, violet, rose and aqua may be provided for as well. In accordance with yet other aspects of the present disclosure, the inner matrix of a dual layer matrix may be tinted and the outer matrix may be formed from a second resin matrix material that is substantially transparent to permit easy viewing of the tinted matrix color of the inner matrix, for example. In accordance with yet other aspects of the present disclosure, prior to application of the transparent second resin matrix, printed characters may be applied to the inner matrix to further identify characteristics of the base ribbon 42, in addition to color coding, and may include such information as fiber type, fiber size, ribbon number, etc. Ink jet printing, laser ablation printing, printing wheels, or any other suitable printing techniques may be used to provide further ribbon identification in addition to the matrix tinting. Placement of the print characters between the inner matrix and the outer matrix may prevent smearing or abrasion of the characters during use in the field. In addition, by intentionally using print with intended contrast to particular colors, the ability to read in low light conditions, for example, can be greatly enhanced. Although described above with an inner matrix having a tinted coloring and the outer matrix being substantially transparent, one or both of the inner matrix and the outer matrix may have a tinted coloring and/or be substantially transparent.

Figure 4:
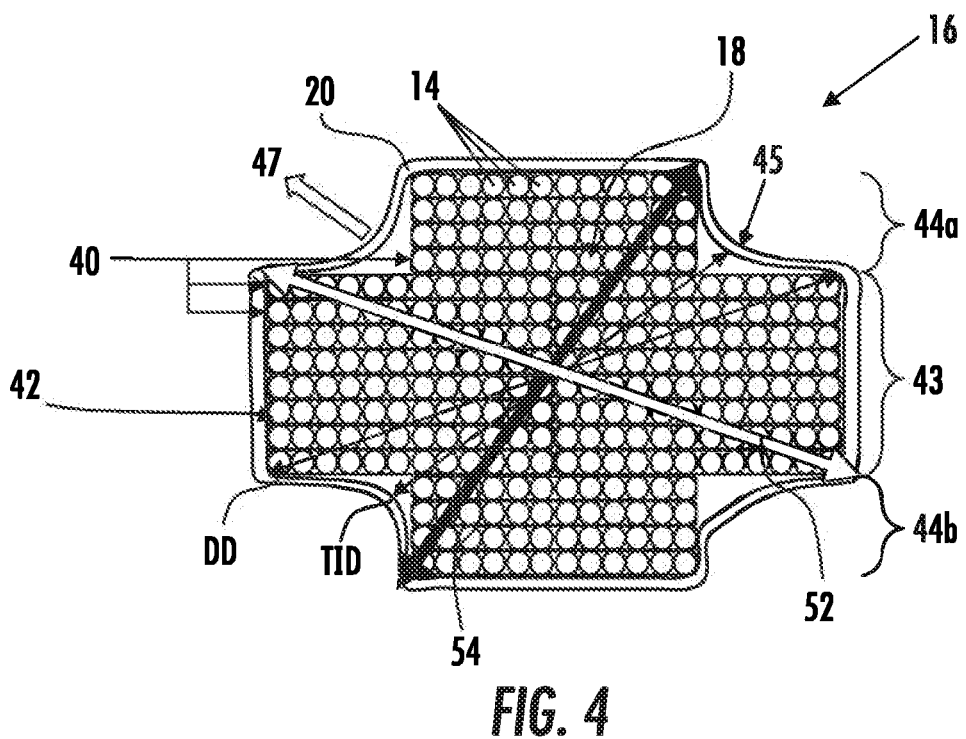
FIG. 4 is a cross sectional view of a vacuum extruded optical fiber subunit, in accordance with aspects of the present disclosure.

Each optical fiber group 18 may comprise any number of stacked optical fiber layers 40, wherein the optical fiber layer 40 may be of varying width to create a stepped perimeter of the optical fiber group 18. For example, as shown in FIGS. 3 and 4, optical fiber group 18 can include a medial subgroup 43 of stacked optical fiber ribbons with at least one set of lateral subgroups 44a, 44b on opposing sides thereof. As shown, medial subgroup 43 may have eight optical fiber layers 40 of 24F ribbons, each layer comprising one 24F ribbon (preferably separable into two 12F ribbons) or two 12F ribbons aligned side-by-side; and lateral subgroups 44a, 44b may each comprise four optical fiber layers 40 of 12F ribbons such that each core subunit 16 as shown has a total of 288 individual optical fibers 14.

In accordance with yet other aspects of the present disclosure, optical fiber layers 40 may include 16F ribbons with 200 μm fibers colored to 208 μm, which makes each 16F ribbon approximately 3.4 mm wide. This may still fit in conventional 250 μm spaced 12F ribbon mass fusion splicers. By going to 16F per mass fusion splice, total splice time for a given fiber count may be reduced by 25% (e.g., a 192F cable has sixteen 12F ribbons; another 192F cable has twelve 16F ribbons). If as expected the time to splice per ribbon is equivalent, then splicing 192F in a subunit with 16F ribbons can be completed in 25% less time than 192F in a comparable 12F base cable. Various configurations of 16F optical fiber groups 18 may be stacked using 8F, 16F, 24F, 32F ribbons. Also, configurations of 256F core subunits 16 with 16F ribbons may be stranded together. For example, 15 core subunits 16 around 9 core subunits 16 with a foam central core, for example, may provide for a 6144 fiber cable.

As shown in FIGS. 1 and 2, cable 10 may have a core 28 with, for example, a total of twelve core subunits 16. As shown, the core 28 may be configured such that nine of the core subunits 16 are stranded externally around three centrally located core subunits 16. A water swellable tape or helically stranded yarns, for example, may be provided to secure and/or bind the three centrally located core elements during manufacture. Alternatively, the core 28 may be stranded on a planetary helical strander such that no binders or central member is required to manufacture the cable 10. The resulting cable 10 has a total fiber count of 3456 fibers when adding the 288 fibers per core subunit 16 in each of the twelve core subunits 16. When configured with minimal free space in accordance with aspects of the present disclosure, the cable 10 may have an outside diameter of 33 mm (1.30 inches) and an area fill ratio of 42%, enabling the cable 10 to fit easily inside a conventional 2 inch (~50 mm) duct.

The number of optical fiber layers 40 and the number of fiber ribbons comprising a layer in each subgroup may vary depending on the size of the cable desired and the fiber density necessary to accommodate fiber demand for that particular cable size. Each optical fiber layer 40 may contain at least one respective layer having at least one optical fiber ribbon, and although described previously as comprising 24F or 12F ribbons, other size optical fibers ribbons may be used such as 16 fiber (16F), eight fiber (8F) ribbons, six fiber (6F) ribbons, or four fiber (4F) ribbons. Each subgroup can be progressively smaller, for example, starting at the medial subgroup and moving to the lateral subgroups. Optical fiber ribbon group 18 can therefore define a step-like profile that can be generally symmetrical about medial subgroup 42. The step-like profile can define a high fiber packing density by substantially filling up the volume of the core 28 with, for example, sets of optical fiber ribbons. The width w and/or height h can be constant from step to step, or they may become progressively smaller or larger from step to step in the profile. Moreover, by changing the fiber size from 250 nm to 200 μm, or increasing the number of fibers in the core subunits 16, may result in even higher fiber densities when comparing similar fiber counts and cable dimensions. In addition, the optical fiber ribbon group 18 may be comprised of a plurality of optical fiber layers 40 of equal width and fiber size, thus presenting a cross-sectional footprint more resembling a rectangle or square and absent the step-like profiles described above.

For example, although specific sizes and configurations are shown and described with respect to FIGS. 1 and 2, such as a two layer cable having a nine (9) around three (3) core subunit stranding, other configurations are contemplated included a cable having just one core subunit 16 in the center, one layer of six stranded subunits 16, other two layer configurations such as twelve (12) around six (6) core subunits 16, or three layer configurations, such as fifteen (15) core subunits 16 stranded around a middle layer of nine (9) core subunits 16 that may in turn be stranded around an inner layer of three (3) core subunits 16. When combined with 200 nm fiber, for example, high fiber count high density cables with fiber counts of more than 7000 fibers which may still fit in a two inch (~50 mm) duct are contemplated.

In normal cable processing where there are multiple subunits being stranded, the subunits are usually helically stranded together with a specific laylength to foster cable bending without undue stress on the subunits. Without stranding, during cable bending, the subunits on the inside of the bend compress and buckle while the subunits on the outside of the bend are put under tension and want to move toward the neutral axis of the cable bend. The stranding process 'averages' the subunit position in the cable. On average, with a stranded subunit, the subunit's center of bending becomes the center of the cable. However, within any one laylength of a stranded subunit, approximately half of the subunit length is under tension while the other half is under compression. If the cable jacket is loose enough, the part of the subunit in tension on the outside of the bend will pull the appropriate amount of length from the part of the subunit experiencing compression on the inside of the bend, which allows the subunit stress to essentially zero out. This mechanism is termed "longitudinal translation" herein. If the jacket 12 is extruded too tightly around the core 28 of stranded core subunits 16, the jacket 12 creates radial normal forces which the subunits have to overcome before they can longitudinally translate during cable bending.

The sheath 20 may be made of a peelable plasticized PVC material tightly extruded to surround each ribbon group 18 in each core subunit 16. The sheath 20 may be a single extruded layer of plasticized PVC that is both thin (e.g., a thickness of between 0.15 mm and 0.5 mm, preferably about 0.25 mm) and comprised of a soft material that easily separates by manually pinching the sheath material. The extruded sheath 20 is tight in that it conforms to the shape of the ribbon group 18 and keeps all of the individual ribbons 42 acting as a whole during longitudinal translation between the subunits inside the cable during cable bending. By maintaining all of the ribbons acting as a whole, the core subunits in accordance with aspects of this disclosure keep any one ribbon from buckling during cable bending. The ability of the sheath 20 to perform this function would also keep any one fiber in a rollable ribbon format from buckling during subunit longitudinal translation. Although embodiments disclosed herein may have an entirely continuous sheath 20, i.e., whole simultaneously in a radial and a longitudinal direction along the entire length of the cable, embodiments may also include a sheath 20 having non-continuous features, such as holes, windows, slits, or gaps, for example, such that a surface area of the sheath 20 with the non-continuous features is at least 50% of the surface area if the sheath 20 was entirely continuous.

Figure 8:
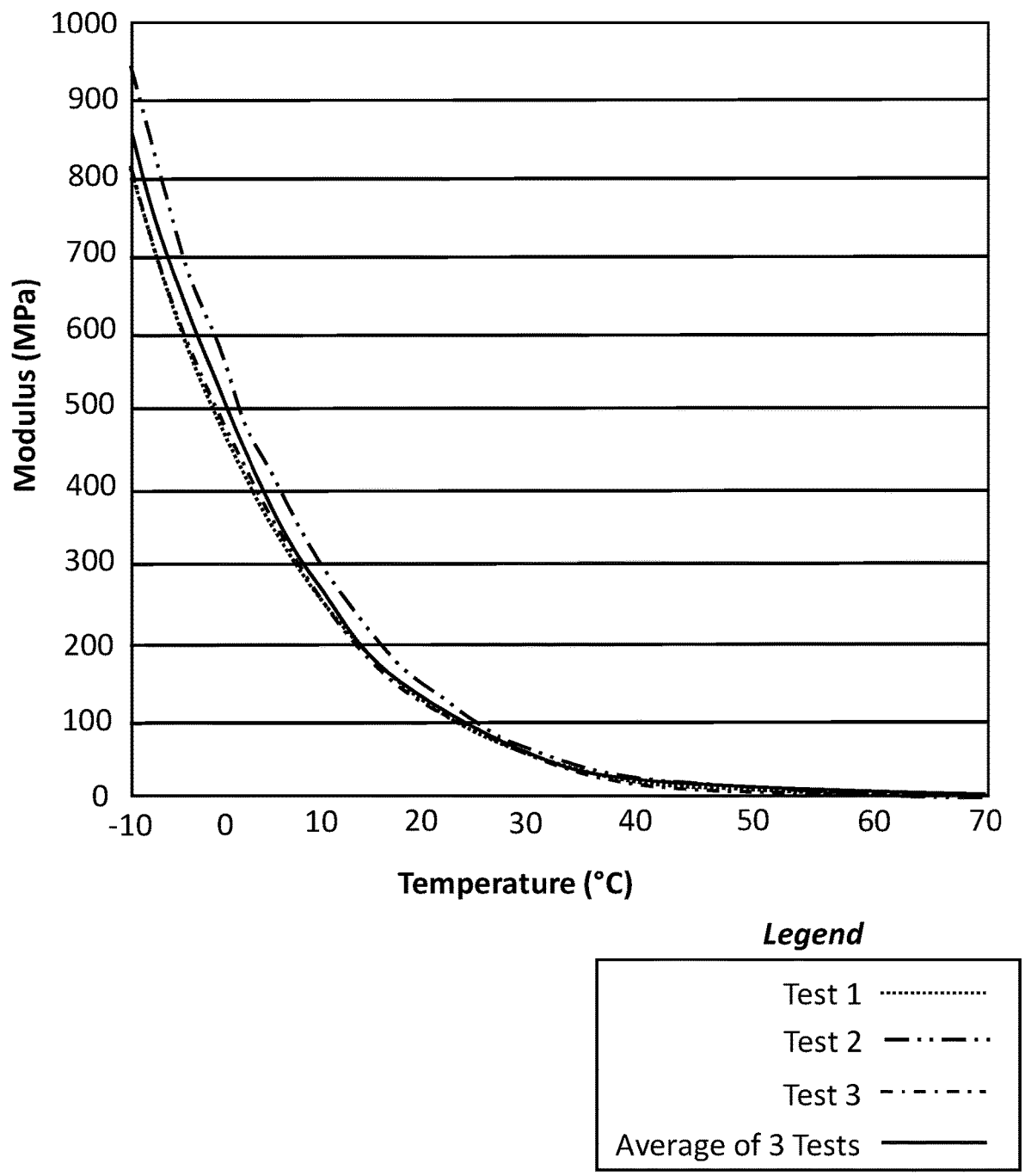
FIG. 8 is a table illustrating the elastic modulus of the cable sheath with respect to temperature, in accordance with aspects of the present disclosure.

The table illustrated in FIG. 8 shows the elastic modulus of sheath 20 (comprising a plasticized PVC material) with respect to temperature. As indicated in the table, the elastic modulus of sheath 20 at room temperature is less than 100 MPa and rises to only approximately 800 MPa at cold temperatures (e.g., −10° C.). Comparatively, a typical fiber optic cable jacket, such as one comprising a medium density polyethylene (MDPE) material, has a higher modulus than 800 MPa at room temperature.

Combined with the thin walls of the sheath 20, an EA (modulus×cross-sectional area) of the sheath 20 is very low, approximately 1000 Newtons, for a subunit 16 having an effective diameter of approximately 6 mm. The sheath area (A) for a thin sheath 20 having 0.25 mm thickness may be calculated as the (squared value of the effective outer diameter of the sheath (e.g., (6 mm) 2) minus the squared value of the effective inner diameter of the sheath (e.g., (5.5 mm) 2))*PI/4. Comparatively, a typical fiber optic cable jacket of MDPE which is thicker and has a higher modulus of greater than 800 MPa has an EA of 61,852 Newtons at room temperature. The material properties of the extruded sheath 20 ensure the sheath 20 does not create undue normal force against the ribbon group 18.

In accordance with yet other aspects of the present disclosure, as shown in FIG. 4, a vacuum may be applied to the extrusion line to cause the sheath 20 to be pulled down more tightly against the ribbons 42 of the ribbon group 18. In this regard, the sheath 20 may form concave bridging portions 45 at the step locations of the ribbon group 18. Vacuum extruding the sheath 20 substantially reduces the free space in the subunit 16 as compared to a conventionally extruded buffer tube. Moreover, during cold temperature cycles, and in combination with the stepped shape of the ribbon group 18, the vacuum fitted sheath 20 provides the ability to stretch in the direction of the arrow 47 to prevent normal forces being applied against the ribbon group 18 by the sheath 20. The conformal sheath 20 has a fiber fill ratio greater than the maximum fill ratio of a round tube. As a result, the conformal sheath 20 may rotate with the ribbon array due to mechanical interference associated with the non-circular shape of the array. The sheath 20 also secures the relative position of each ribbon within the array and presents a consistent boundary between the edges of the ribbon array and surrounding cable elements.

As shown in FIGS. 3 and 4, the sheath 20 may be extruded around a stack of conventional ribbons where the ribbons are two different widths (12F ribbons and 24F ribbons). However, the extruded sheath 20 may be applied to any of a number of fiber bundle arrangements, for example a ribbon stack of one ribbon width (e.g., 12×12F ribbons), or intermittently connected rollable ribbons. The extruded sheath 20 may also contain sub-bundles of fibers, for example multiple fiber groups of rollable or conventional ribbons inside binder threads all inside the extruded sheath 20. The extruded sheath 20 may be generally round, square, rectangular or other shapes, and each individual sheath 20 in a cable having a bundle of core subunits 16 may be colored a different color to enhance configuration management and routing of the fibers in the separate subunits 16. Additional print markings may be provided on the outside of the sheath 20 to provide additional configuration or product information, such as numbering to identify individual core subunits 16 and/or, for example, information about the types of fibers contained in each core subunit 16.

Although the sheath 20 is described above as tight, at the same time the extruded sheath 20 is loose or just loose enough such that when a length of a core subunit 16 is (individually or as a group inside the cable) bent and coiled, the individual ribbons 42 are free to adjust themselves longitudinally with respect to each other, longitudinally translating inside or within the extruded sheath 20, relieving bending stresses and keeping the individual ribbons 42 from buckling. This applies to fibers in a rollable ribbon configuration as well. The special material of the sheath 20 does not squeeze radially or continue to squeeze radially and create normal forces between the ribbons or fibers that would hinder individual core subunit 16 longitudinal translation.

Each individual ribbon group 18 is stranded to twist longitudinally within the core subunit 16. The stranded laylength of the ribbon groups 18 should be in the range of 300-600 mm based on residual fiber strain due to stranding (twisting). The ribbon group laylength and core subunit 16 stranding pitch should not have the same value, due to a differential length buildup between the top and bottom ribbons. For cables made with unidirectional tube stranding (not SZ), the ribbon strand may be in one direction, and the core subunit strand is in the other direction (regular lay). In accordance with other embodiments, the cables with unidirectional tube stranding may be made with the ribbon group strand and the core subunit strands being stranded in the same direction (lang lay). In the case of cables with a lang lay configuration, differential length builds up since one ribbon is always towards the center of the cable and one ribbon is always on the outside of the cable during this condition. Differential buildup leads to high excess ribbon length (ERL) and macrobending.

To reduce differential length buildup and maintain minimum strain on the ribbon group 18, various configurations may be used, such as a 300 mm ribbon group laylength and a 600 mm stranded core subunit laylength, a 600 mm ribbon group laylength and 900 mm stranded core subunit laylength, a 500 mm ribbon group laylength and 1000 mm stranded core subunit laylength, and/or other suitable configurations in which the ribbon group 18 and the core subunit 16 laylengths vary. The stranding of the core subunits 16 may be loose enough that the core elements 16 may adjust longitudinally or "longitudinally translate" during bending and tensile.

The sheath 20 may be a continuously (radially and longitudinally continuous) applied thermoplastic material. Optical fibers and ribbons made from optical fibers have a high tensile rigidity due to the strength of the glass fibers but a low buckling threshold due the small diameter of each fiber. Bending performance is enhanced by stranding but the optical fibers must be able to slide by compressive force applied at distance of about ¼ of the stranding pitch without buckling to prevent signal loss. The conformal sheath 20 functions as a boundary to limit separation between the ribbons 42 within the array due to buckling forces during normal handling of the cable or subunit. The continuous sheath 20 prevents localized ribbon or fiber buckling issues that can occur in cables with unbound ribbons or fibers or in cables with ribbon or fibers bound with binder yarns, for example, wherein there is sufficient free space or gaps for the fibers or ribbons to buckle through the binders. These macrobend events can be described as statistical outliers, where the majority of fiber length does not have a bend problem, but only a very small fraction of the length has a bend or buckling problem. Much of optical cable design and attenuation performance in standard loose tube fiber optic cables, or in cables with less than 50% area ratio comes down to managing outlier attenuation bends. For a fiber optic cable to have good attenuation in bending and tension during installation, handling, and lifetime operation, the fibers individually and in aggregate must be able to find a path to relieve bending stresses, whether tensile or contractive.

By having a subunit fiber density of 30% or greater, but more preferably 40%, or most preferably 50% or greater inside the continuous extruded sheath 20, individual fibers of a rollable ribbon cannot find their own path separate from the subunit group that would cause macrobending attenuation outliers. On the other hand, a ribbon group 18 with high fiber density inside the extruded sheath 20 ensures that individual ribbons are not capable of buckling. In accordance with embodiments of the present disclosure, a core subunit 16 having a 288F ribbon group 18 configuration as shown in FIG. 4, i.e., a medial subgroup 43 of eight stacked 24F ribbons and lateral subgroups 44a, 44b of four 12F ribbons each, may have an inside the subunit fiber area ratio of 50% to 70%, meaning that 50%-70% of the entire area inside of sheath 20 is occupied by actual optical fibers and the remaining 30%-50% of inside area is primarily ribbon matrix material and/or limited free space. In one particular embodiment, having a vacuum fitted sheath 20, the inside the subunit fiber area ration is 62%. The same ratios generally apply whether the fibers are 250 micron fibers or 200 micron fibers, although the inside area of the core subunit 16 is reduced when using 200 micron fibers. Cable density can also be reviewed in terms of the jacket outer diameter and in terms of inside the jacket inner diameter. Cables in accordance with aspects of the present disclosure may have a fiber density range of 19 to 23% on the jacket outer diameter and 27-33% inside the jacket inner diameter.

Buckling forces within the core subunit 16 are limited by several design factors in addition to limiting the residual radial compression due to the material properties the sheath 20, including the relationship of the friction coefficient between ribbons, between the ribbons 42 and the sheath 20, and between the sheaths 20 of individual subunits 16 and surrounding cable elements (e.g., other subunits 16 and/or the enclosing element 30); stranding; and limiting residual radial compression within the surrounding cable structure. For example, to enable efficient longitudinal translation between the core subunits 16 within the cable 10 during bending, while ensuring that each individual ribbon group 18 and corresponding subunit 16 act as one unit, the friction between two or more subunits 16 and/or between the subunits 16 and the enclosing element 30 should be lower than the friction between the sheath 20 of a subunit 16 and the ribbon group 18 contained therein.

Friction testing was performed in accordance with guidelines provided by ASTM D 1894-14 with noted variations. The test involved using an MTS 5 kN load frame and an MTS 5N load cell with a ribbon or PVC base having a width of 32 mm or 38 mm and a 61.8 g aluminum sled with beveled edge and a 77.5 g PVC insert having a width of 47.6 mm. In some cases, deviations to the ASTM recommendations were made to sled weight and width, and foam backing. Several variations were utilized to process the PVC into sheet form including milling of the compound prior to processing the compression molded plaques, processing of the compression molded plaques without milling, processing of the compression molded plaques with a mylar film to produce a surface finish.

The mean kinetic Coefficient of Friction (CoF) between core subunits 16 (i.e., between sheath 20 of a first core subunit 16 and sheath 20 of a second core subunit 16) was measured at approximately 0.5, which is the average of data from samples prepared with mylar film peeled from surface. A range for mean CoF between subunits may be between 0.3 to 0.7. Similarly, the mean kinetic CoF between a core subunit 16 and an enclosing element 30, in this case a non-woven water-swellable tape, was approximately 0.5. A range for mean CoF between subunits and the enclosing element 30 may be between 0.3 to 0.7.

In accordance with other aspects of the present disclosure, a suitable friction reduction agent, such as talc or silicone powder, for example, may be added to the outer surface of the sheath 20 and or the inner surface of the enclosing element 30. With talc dusted on the PVC sheath surfaces for testing, the mean kinetic CoF between core subunits 16 (i.e., between sheath 20 of a first core subunit 16 and sheath 20 of a second core subunit 16) was reduced to approximately 0.375, while the mean kinetic CoF between a core subunit 16 and an enclosing element 30, both dusted with talc, remained approximately 0.5. The mean kinetic CoF between a ribbon group 18 and the sheath 20 of a corresponding core subunit 16 was measured at 2.8. A range for mean CoF between a ribbon group and the sheath of a corresponding core subunit may be 2.0 to 3.5.

As noted, by maintaining of CoF ratio of the CoF between ribbon and sheath that is at least three times greater and up to ten times greater than the CoF between core subunits and other cable elements (e.g., other core subunits and/or the enclosing element), the core subunits 16 can slide (longitudinally translate) within the cable 10 during bending, while high friction between the ribbons and the inner surface of the sheath 20 maintains the ribbon group 18 and the sheath 20 acting as one unit. When a cable bends, the cable attempts to take an oval form. Normal forces coming from cable ovality press the core subunits together and the core subunits in turn squeeze the ribbons. The higher CoF between the PVC material of the subunit sheath and the ribbons as compared to the CoF between the subunits and/or subunits and the waterswellable tape enclosing element, enables and even fosters subunit translation (the sheath and ribbons moving together as a unitary body) and maintenance of attenuation well within acceptable limits.

As shown in FIG. 4, a minimum tube inside diameter (TID) of the sheath 20 may be less than a maximum diagonal dimension (DD) of the ribbon group 18. The thin walls of the sheath 20 reduce strain on the ribbon group 18 and individual ribbons or fiber caused by shrink-back when the tubes cool after extrusion. Shrink-back is further reduced by the tight coupling of the sheath 20 to the ribbon group 18. However, the soft nature of the material used for the sheath 20 permits sufficient ribbon and fiber movement during bending and twisting to reduce strain on the fiber group 18 and attenuation on individual fibers, particularly corner fibers in contact with the inside of the sheath 20 walls. In addition, the low-compression modulus of the sheath 20 provides a softer surface than typical subunit walls, such as conventional buffer tubes, which prevents microbending in the corner fibers while allowing a limited amount of ribbon movement and stack adjustment during cable bending and twisting. The softer material of sheath 20 allows corners fibers to move to reduce stress on the individual corner fibers and attenuation degradation.

In accordance with aspects of the present disclosure, waterblocking material, such as super-absorbent polymer (SAP) powder may be added to the interior of the sheath 20. Waterblocking SAP—when water is not present—is a hard particle that may cause microbending (like pressing a fiber into sandpaper) when the ribbon stack is forced against a tube wall during cable bending or coiling, tensile testing and/or temperature cycling. Specifically, the ribbon stack corner fibers exhibit the most microbend attenuation since these fibers are in direct contact with the waterblocking powder and the tube wall.

Compared to conventional buffer tubes, however, the softer material of sheath 20 alleviates microbend attenuation issues due to the addition of waterblocking SAP powders to an interior of sheath 20. Conventional buffer tubes, for example, are unable to absorb the localized pressure created when the powder is compressed between the hard matrix of ribbon group 18 and the buffer tubes, resulting in microbend attenuation. The softer material of the sheath 20 is able to compress and absorb these localized stresses thus preventing the microbend attenuation issues typical of conventional buffer tube designs and allowing the addition of water blocking powder to the interior of the sheath 20. SAP powders having an average particle size of between 1 micron and 100 microns may be used. For example, in embodiments, the average particle size of the superabsorbent polymer powder may be less than or equal to 80 microns. In other embodiments, the average particle size of the superabsorbent polymer powders may be less than or equal to 50 microns. In still other embodiments, the average particle size of the superabsorbent polymer powders may be less than or equal to 38 microns, and in yet other embodiments, the average particle size of the superabsorbent polymer powders may be less than or equal to 25 microns. Further, the SAP powders may have particles that are by design spherical in shape.

Although small SAP powder sizes may be used, in certain other embodiments, SAP powders with average particle sizes of greater than 100 microns may be used. In particular, because of the softer material of the sheath 20, as discussed above, the microbend attenuation problems one would expect to see in a cable with such high fiber density and limited free space is reduced or eliminated. The sheath 20 absorbs much of the stress that would be transferred to ribbons and/or fibers associated with SAP powder and conventional hard buffer tube designs.

The tight ribbon stack of the ribbon group 18 prevents migration of SAP powder between the individual ribbons 42. By preventing migration of the SAP powder between ribbons, attenuation issues caused by microbend attenuation as a result of the SAP powder being pressed between two hard ribbons may be prevented. The use of larger SAP powders with average particle sizes of greater than 100 microns may further prevent against SAP powder migrating between individual ribbons.

Although disclosed as SAP powders, other water blocking materials, such as swellable hot melts incorporating SAP particles, may be applied to the interior of the sheath 20 and/or onto surfaces of the ribbon group 18, preferably at locations where free space may exist, such as at the corners of step increases between fiber counts in fiber subgroups. In this manner, water migration in the limited free spaces in the high density cables of the present disclosure may be reduced or prevented. In addition, the SAP powders as applied may serve as a friction reducing agent between, for example, the ribbon group 18 and the sheath 20.

As shown in FIGS. 1 and 2, the enclosing element 30 may be a water blocking element such as a tape with embedded or applied SAP powder. Additionally, as shown in FIG. 2, a core water-blocking element 50, which may be a non-woven water blocking tape, for example, may be incorporated into the center of the cable during manufacture. For example, the core water-blocking element 50 may be introduced during the stranding process of the subunits 16 in a manner that the core water-blocking element 50 randomly bunches and squeezes into the interstitial spaces between the inner-most set of core subunits 16. As shown in FIG. 2, the core water-blocking element 50 may be a water-blocking tape having a lateral dimension much greater than the effective diameter of any of the core subunits 16. As shown in FIG. 7, the water-blocking element 50 may be manufactured to form a shape having three legs extending from the cable center. Each leg may be comprised of one or more layers of the water-blocking element material and be offset from each of the other legs by approximately 120° radially when viewed in cross-section.

When referring to the effective diameter of a core subunit 16, because the sheath 20 and the ribbon group 18 may not necessarily present a round or circular cross-sectional shape, one must first determine the major and minor diagonal dimension of the core subunit 16, shown as arrows 52 and 54, respectively, in FIG. 4. The effective diameter of the core subunit 16 is the average of the major diagonal dimension 52 and the minor diagonal dimension 54. For example, for the a 288F subunit made with 250 nm fiber ribbons as shown in FIG. 4, the major diagonal dimension 52 is 6.91 and the minor diagonal dimension 54 is 6.03 mm, respectively. Averaging these, this core subunit 16 effective diameter is 6.47 mm.

The lateral dimension of the core water-blocking element 50 is must be substantially larger than the effective diameter of the innermost core subunits 16 to serve the purpose of waterblocking through random bunching and placement into the interstitial spaces between the innermost set of core subunits 16. For example, the core water-blocking element 50 may also be a non-woven swellable tape similar to or the same as the swellable tape used as the enclosing element 30, with similar CoF. The tape is extremely thin and may have a lateral dimension of between 10 mm and up to 200 mm, preferably between 65 mm and 110 mm.

In accordance with other aspects of the present disclosure, in addition to or in lieu of the enclosing element 30, small particles (i.e., ~1 um) may be introduced into the interior of the jacket 12 and or interior of the enclosing element 30, to reduce friction between the core subunits 16 and the jacket. These particles could be selected from, but not limited to, the following examples: graphite, UHMW beads, silicone, talc, and superabsorbent polymers (e.g. sodium polyacrylate). A reduction in friction allows the core subunits 16 enables the core subunits 16 to more easily longitudinally translate to find the path of least strain during bending.

In various embodiments, sheath 20 may be colored and/or printed upon to identify the core subunits 16 and/or other properties of core components such as the type of optical fibers 14 (e.g., 250 nm or 200 μm) comprising the fiber group 18.

Figure 5A:
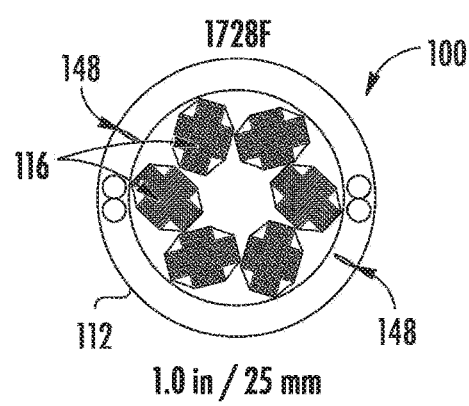
FIGS. 5A-5E illustrate cross-sectional views of various sized cables in accordance with aspects of the present disclosure.
Figure 5B:
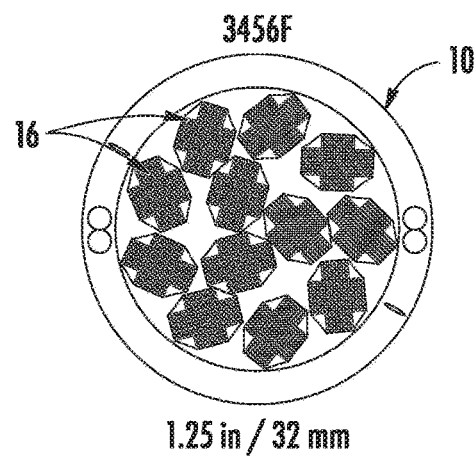
Figure 5C:
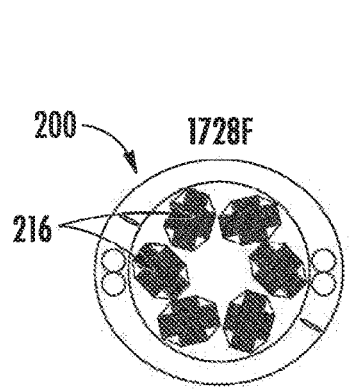
Figure 5D:
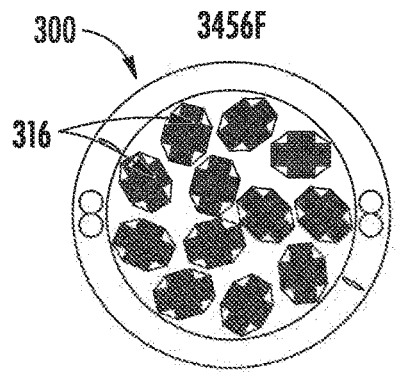
Figure 5E:
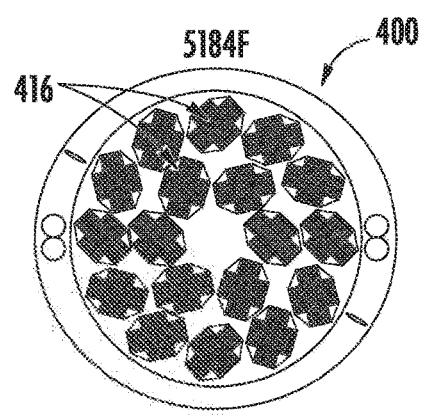

FIGS. 5A through 5E illustrate various cables manufactured in accordance with the features and principles disclosed herein. FIG. 5A illustrates a cable 100 having six subunits 116 with each subunit having 288 fibers. The fibers are 250 μm fibers. This results in a cable with 1,728 fibers in a jacket having an outer radius of approximately 1.0 inches or 25 millimeters. FIG. 5B has been described and comprises a cable 10 having twelve subunits 16 with each subunit having 288 fibers. The fibers are 250 μm fibers. This results in a cable with 3,456 fibers in a jacket having an outer radius of approximately 1.25 inches or 32 millimeters. FIG. 5C illustrates a cable 200 having six subunits 216 with each subunit having 288 fibers. The fibers are 200 μm fibers. This results in a cable with 1,728 fibers in a jacket having an outer radius of approximately 0.8 inches or 21 millimeters. FIG. 5D illustrates a cable 300 having twelve subunits 316 with each subunit having 288 fibers. The fibers are 200 μm fibers. This results in a cable with 3,456 fibers in a jacket having an outer radius of approximately 1.10 inches or 28 millimeters. FIG. 5D illustrates a cable 400 having twelve subunits 416 with each subunit having 288 fibers. The fibers are 200 μm fibers. This results in a cable with 5,184 fibers in a jacket having an outer radius of approximately 1.30 inches or 33 millimeters.

According to one aspect of the present embodiment, as shown in FIG. 5A, for example, the jacket 112 may may include jacket features to promote easy access to the cable core and/or cable components such as sensing fibers. The cable jacket 112 may include one or more embedded elongate members, shown as access features 148. In general, access features 148 are elongate members or structures embedded within the material of cable jacket 112. In various embodiments, access features 148 are contiguous members that extend the length of cable jacket 112 between the first and second ends of the cable.

In general, cable jacket 112 is made from a first material, and access features 148 are made from a second material that is different from the first material. The difference in materials provides a discontinuity or weakness within cable jacket 112 at the location of access features 148. These discontinuities provide an access point that allows a user of cable 100 to split cable jacket 112 when access to subunits 116 may be desired. In various embodiments, access features 148 may be formed from a material (e.g., a polypropylene/polyethylene blend) with low bonding relative to the material of cable jacket 112 (e.g., a medium density polyethylene) that allows for jacket splitting by the user. In various embodiments, access features 148 may be formed (e.g., coextruded) as described below. In other embodiments, access features 148 are non-extruded elements, such as rip cords, that are embedded in the material of cable jacket 112.

In the exemplary embodiment, the access features 148 are bonded to the main portion of the jacket when the jacket 112 is extruded. The main portion and the access features 148 can be formed from extrudable polymers, so that as the extrudate used to form the main portion of the jacket 112 and the access features 148 cools and solidifies, the extrudates become bonded at an interface of the access features 148. When the access features 148 are formed while extruding in the same step as the main portion of the jacket 112, the bond between access features 148 and the remainder of the jacket 112 can be generally described as enabled by polymer chain entanglement as the jacket 112 solidifies. The jacket 112 accordingly comprises a cohesive composite structure. The interfaces may be a transition region between the materials of the main portion of the jacket 112 and the access features 148.

The access features 148 can be relatively narrow strips in the jacket 112, and may occupy relatively small portions of the jacket cross-sectional area. In FIG. 5A, two access features 148 are formed in the jacket 112 to facilitate opening of the jacket. However, the number, spacing, shape, composition and other aspects of the access features 148 can be varied.

In accordance with aspects of the disclosure, the main portion of the jacket 112 may be extruded from medium density polyethylene (MDPE), and the access features 148 may be extruded from polypropylene (PP). The jacket 112 may be formed in a coextrusion process so that the main portion of the jacket 112 and the access features 148 bond during cooling to form relatively strong bonds at the interfaces.

Figure 6:
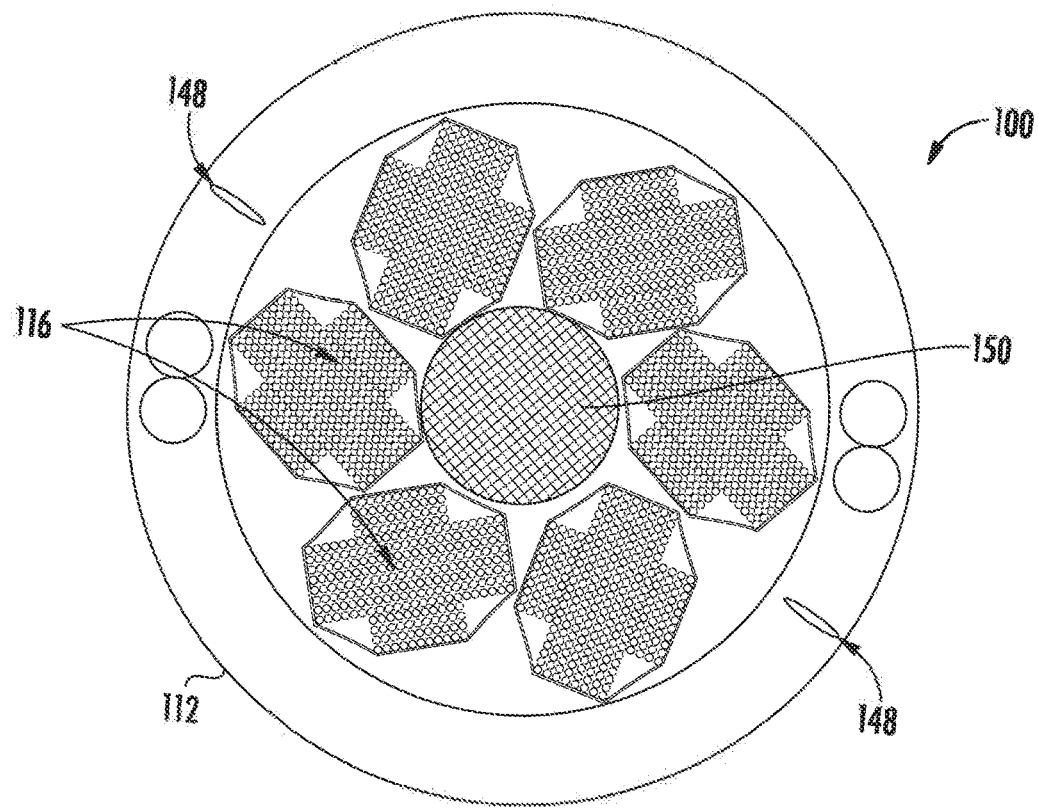
FIG. 6 is a cross-sectional illustration of a cable with central foam rod, in accordance with aspects of the present disclosure.

In accordance with yet other aspects of the present disclosure, FIG. 6 illustrates use of a foam filler rod 150 in cables such as cable 100, for example, in which there may be an empty space at center of the core of the cable. The foam filler rod 150 assists to distribute external forces on the cable across multiple fibers and over some length to increase the overall load and deflection the cable is able to withstand before reaching attenuation limits during testing. For example, an 80% density reduction foamed core doubled the average crush load during load characterization testing and reduced failure rate from 100% to 22% for GR-20 standard crush tests. Moreover, the foam filler rod 150 prevents subunits from moving into the center of the stranded subunits, which ensures all subunits are the same length and tensile loads are distributed across all subunits and contributes to a round finished cable for easier jetting installation with current equipment.

In accordance with aspects of the present disclosure, attributes of a preferred foamed filler rod include low tensile strength to prevent crush force during tensile testing on subunits on the compression side of the central member and an 80% density reduction of LDPE material to adequately provide distribution of external forces. The outside diameter of the foam filler rod 150 may be geometrically optimized for the number of subunits in accordance with the chart below. The sizing targets a 2-4% gap between the foam filler rod and the subunits.

|   | Subunit Size # of Subunits | 6.5 mm Central Member Size |
|---|---|---|
| ○ | 4 | 3.0 mm |
|   | 5 | 4.8 mm |
|   | 6 | 7.0 mm |

The optical fibers discussed herein include optical fibers that may be flexible, transparent optical fibers made of glass or plastic. The fibers may function as a waveguide to transmit light between the two ends of the optical fiber. The optical fibers include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage and/or provides distinguishing markings. These coatings may be UV-cured urethane acrylate composite materials applied to the outside of the optical fiber during the drawing process. The coatings may protect the strands of glass fiber.

Fiber types in may include G.652, G.657.B3, G.657.A2/B2, G.657.A1. These fiber types can have a 1310 nm MFD from 8.2 to 9.6 microns. However, fiber having an MFD≥9 microns may be preferred because of compatibility with legacy cable and ease of splicing. The novel extruded sheath 20 and resultant cable performance enhancements enable use of fibers having MFD of ≥9 microns at 1310 nm. In accordance with aspects of the present disclosure, these high fiber count cable designs enable fibers having MFD of ≥9 microns at 1310 nm (e.g., 9.0, 9.1, 9.2, 9.3 microns at 1310 nm) while meeting attenuation requirements, which is preferred due to no mode field mismatch when splicing to the other fibers in existing networks. The higher cost, special bend fibers with MFDs at 8.8 nm or other lower MFDs may be used in cases where there is a particularly identified requirement, for example if the stripped fiber is stored outside the cable in a very tight splice tray. In addition, the special bend fibers may enable even smaller diameter cables with higher densities if the fibers are less than 200 microns in diameter, such as 185 microns or less.

The present inventions have thus been described with reference to the exemplary embodiments, which embodiments are intended to be illustrative of inventive concepts rather than limiting. Persons of ordinary skill in the art will appreciate that variations and modifications of the foregoing embodiments may be made without departing from the scope of the appended claims. The step-like profile can include the interposition of a subgroup having a larger or smaller fiber count than neighboring subgroups. Further, the optical fiber subgroups can respectively include generally unequal optical fiber counts (not shown). Optical fibers that are less bend-sensitive can be placed in predefined locations in a group/subgroup/ribbon for maintaining a low overall attenuation of the fiber optic cable.

We claim:

1. An optical fiber cable comprising:
a plurality of stranded core subunits, each core subunit comprising:
a flexible sheath; and
a plurality of ribbons arranged in a ribbon group, wherein each ribbon of the plurality of ribbons comprises a plurality of connected optical fibers such that 50-70% of the cross-sectional area inside the sheath is occupied by the connected optical fibers, wherein further the flexible sheath is drawn tightly about the ribbon group such that the flexible sheath is at least partly conformal to the ribbon group and wherein the sheath is vacuum extruded and conforms to the shape of the ribbon group such that all of the ribbons of the ribbon group act as a unitary body during longitudinal translation of any individual core subunit with respect to any other individual core subunit; and
a jacket surrounding the plurality of stranded core subunits.

2. The optical fiber cable of claim 1, wherein the jacket comprises at least two pairs of strength elements, each pair of strength elements embedded within the jacket on diametrically opposite sides of the cable.

3. The optical fiber cable of claim 1, further comprising an enclosing element surrounding the stranded core subunits and between the stranded core subunits and the jacket.

4. The optical fiber cable of claim 3, wherein the enclosing element is a non-woven water-swellable tape.

5. The optical fiber of claim 3, wherein the enclosing element is a metal or dielectric armor.

6. The optical fiber cable of claim 3, wherein the mean kinetic coefficient of friction (CoF) between an individual core subunit and the enclosing element is less than 0.7.

7. The optical fiber cable of claim 1, wherein the mean kinetic Coefficient of Friction (CoF) between the ribbon group and the sheath is less than 5.0.

8. The optical fiber cable of claim 7, wherein the mean kinetic CoF between a ribbon in the ribbon group and the sheath of a corresponding core subunit is between 2.0 and 3.5.

9. The optical fiber cable of claim 1, wherein the mean kinetic coefficient of friction (CoF) between a ribbon in the ribbon group and the sheath of a corresponding core subunit is at least three times greater than the CoF between individual core subunits such that the sheath and the ribbon group move together as a unitary body during bending.

10. An optical fiber cable, comprising:
a plurality of stranded core subunits, each core subunit comprising:
a flexible sheath; and
a plurality of ribbons arranged in a ribbon group, wherein each ribbon of the plurality of ribbons comprises a plurality of connected optical fibers such that 50-70% of the cross-sectional area inside the sheath is occupied by the connected optical fibers, wherein further the flexible sheath is drawn tightly about the ribbon group such that the flexible sheath is at least partly conformal to the ribbon group;
a core water-blocking element, wherein the water-blocking element comprises a non-woven water-swellable tape randomly bunched and placed into interstitial spaces at a center of the stranded core subunits; and
a jacket surrounding the plurality of stranded core subunits.

11. The optical fiber cable of claim 1, further comprising an SAP powder applied to the inside of each of the stranded subunits.

12. The optical fiber cable of claim 11, wherein an average size of each particle of the SAP powder is 100 micron or greater.

13. The optical fiber cable of claim 11, wherein there is an absence of SAP powder in between any of the ribbons in the ribbon group.

14. The optical fiber cable of claim 1, further comprising at least one separation feature co-extruded into the jacket.

15. The optical fiber cable of claim 1, wherein the mean kinetic coefficient of friction (CoF) between an individual subunit in the plurality of stranded core subunits and the jacket is between 0.3 and 0.7.

16. The optical fiber cable of claim 10, wherein the mean kinetic coefficient of friction (CoF) between a ribbon in the ribbon group and the sheath of the subunit is between 2.0 and 3.5.

17. The optical fiber cable of claim 1, wherein the sheath comprises an extruded polymer material having a modulus of elasticity less than 800 MPa at room temperature.

18. The optical fiber cable of claim 1, wherein the sheath comprises an extruded polymer material having a modulus of elasticity less than 200 MPa at room temperature.

19. The optical fiber cable of claim 10, wherein the sheath comprises an extruded polymer material having a modulus of elasticity less than 800 MPa at room temperature.

20. The optical fiber cable of claim 10, wherein the sheath is vacuum extruded and conforms to the shape of the ribbon group such that all of the ribbons of the ribbon group act as a unitary body during longitudinal translation of any individual core subunit with respect to any other individual core subunit.

* * * * *